D. H. WEIR.
ANTISKID DEVICE FOR WHEEL TIRES.
APPLICATION FILED DEC. 16, 1916.
1,241,066.
Patented Sept. 25, 1917.
2 SHEETS—SHEET 1.
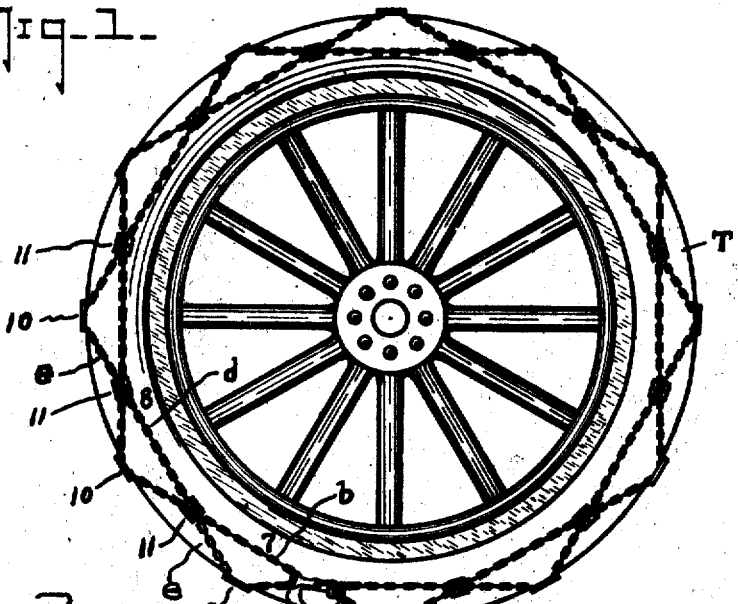
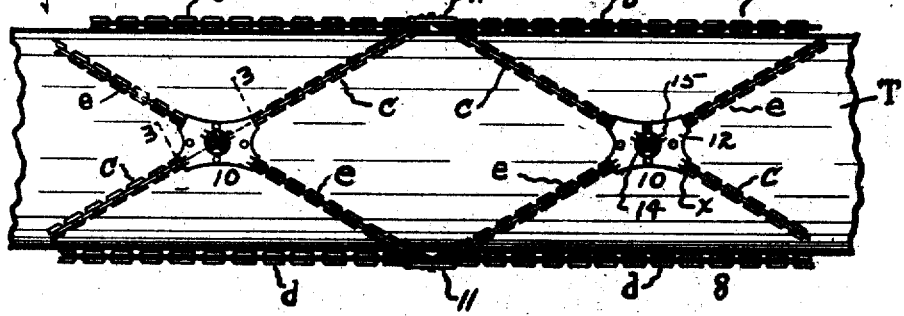
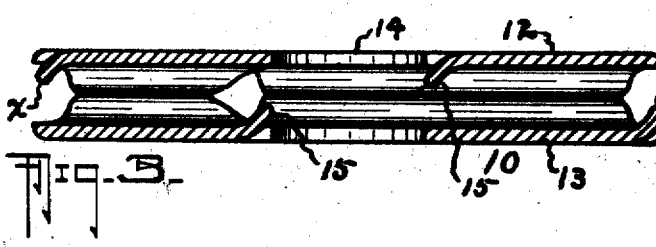
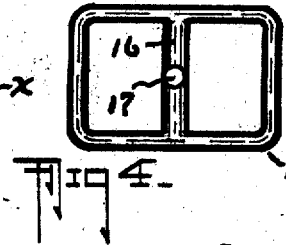
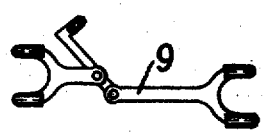
Inventor
David H. Weir,
By Hiram A. Sturges.
Attorney

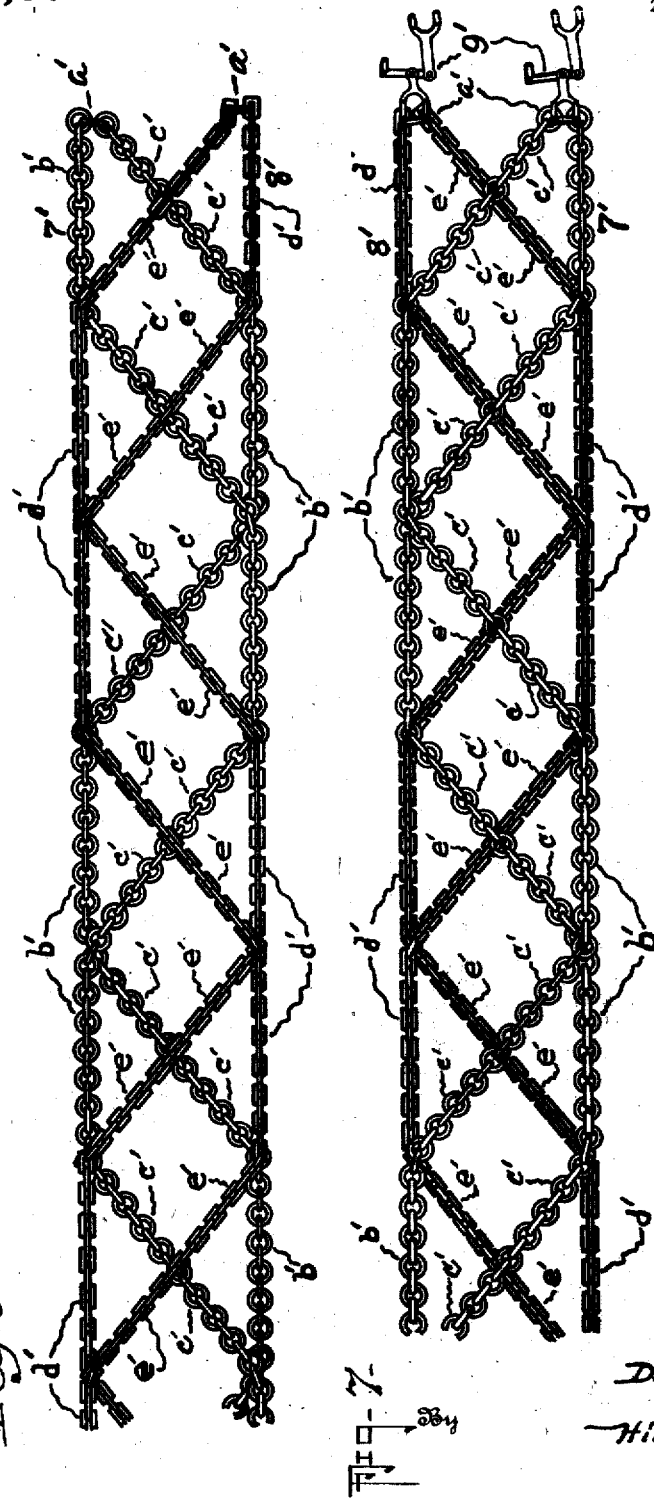

UNITED STATES PATENT OFFICE.

DAVID H. WEIR, OF OMAHA, NEBRASKA.

ANTISKID DEVICE FOR WHEEL-TIRES.

1,241,066.  Specification of Letters Patent.  Patented Sept. 25, 1917.

Application filed December 16, 1916. Serial No. 137,426.

*To all whom it may concern:*

Be it known that I, DAVID H. WEIR, a citizen of the United States, residing at Omaha, in the county of Douglas and State of Nebraska, have invented certain new and useful Improvements in Antiskid Devices for Wheel-Tires, of which the following is a specification.

This invention relates to an anti-skid device for vehicle tires, and has for its object, broadly, to provide means which will operate to advantage to prevent skidding, or slipping of vehicle wheels, said means to consist of few and simple parts so that durability may be attained and that manufacture may be convenient and economical.

The invention includes a shield for rubber tires consisting of a pair of endless chains so arranged that each chain will be disposed with parts at the sides and parts at the periphery of the tire.

With the foregoing objects in view the invention presents a novel construction, combination and arrangement of parts as described herein and claimed, and as illustrated in the accompanying drawing, wherein, Figure 1 is a view of a vehicle wheel in side elevation, showing the device mounted on the tire. Fig. 2 illustrates, on an enlarged scale, a plan view of a part of a vehicle tire with the device mounted thereon. Fig. 3 shows one of the plates for containing the intersecting parts of the chains at the periphery of the tire, the view being a section on line 3 3 of Fig. 2. Fig. 4 is a plan view showing a clasp or keeper for containing the intersecting chains at the sides of the tire. Fig. 5 shows a clutch for connecting the end loops. Figs. 6 and 7 are broken plan views, each showing a part of two chains in extended position, and clamps used for connecting their ends.

Referring now to the drawing for a more particular description, and particularly to Figs. 1 and 2, the anti-skid device consists, in part, of a pair of endless chains 7 and 8 of substantially equal length, and each having a length when doubled or folded longitudinally somewhat greater than the length of the tire T since it is disposed to cross the tire from side to side when mounted thereon, the loops *a* of the doubled chains being disposed adjacent to each other as shown in Fig. 1, so that said loops may be connected by the clamping members 9 or other suitable means.

In order that the device may discharge the functions first mentioned, certain holders are provided for temporarily maintaining the pair of endless chains in connected relation, as the tread plates 10 and the clasps 11, said pair of endless chains being arranged uniformly as compared with each other, each traversing the plates and clasps, as will be explained.

In order that the arrangement of the chains may be fully understood it should be stated that the endless chain 7 has parts *b* disposed at the sides and has parts *c* which cross the periphery of the tire; also that the endless chain 8 has parts *d* disposed at the sides and has parts *e* which cross the periphery of the tire, the parts *b* and *d* being substantially of equal length, and length of parts *c* and *e* being uniform as compared with each other. The parts *c* and *e* which cross each other at the periphery of the tire are embraced by the tread-plates 10, and the intersecting parts of the chains at the sides of the tire are embraced by the clasps 11.

While I do not wish to limit myself to exactness of details in the construction of the plates and clasps, I prefer a hollow plate open at its ends and having substantially flat sides which may contain the intersecting parts of the chains so that when the device is reversed or inverted the plates will not injure the tire. These peripheral plates 10 preferably consist of a pair of adjacent, attenuated, connected, metallic sheets 12 and 13, each being provided midway between its ends with an aperture 14 and with inwardly projecting lugs *x* at its ends and having an inwardly projecting lug 15 formed in the wall of its aperture, said sheets preventing actual contact of the chains with the periphery of the tire, and the lugs tending to catch in the links of the chains for resisting stresses, and preventing creeping of one chain independently of the other.

The clasps 11 are adapted to encircle the intersecting parts at the sides of the tire and tend to hold them in connected relation since each clasp is provided with a cross-bar 16 and with a lug 17 on the cross-bar tending to engage the links, the arrangement being that the clasps provide two openings, as plainly shown in Fig. 4, the chains engaging the bar 16 and the ends of the clasps, said bar 16 being provided with lugs 17 at its sides, each adapted to engage in a link of a chain.

As thus described it will be seen that the device may be inverted when one of the sides of each endless chain has become worn, and each endless chain when unduly worn at or near the periphery of the tire may be shifted longitudinally so that the parts at or near the periphery may be disposed at the sides of the tire since the chains are endless. When shifting the chains for this purpose, the links, of course, are loosened or detached from the lugs of the tread-plates and clasps. Also by the construction as described, it will be seen that "creeping" of the chains longitudinally of the tire will be permitted, it not being necessary that the chains should compress the tire, and no connection of the device with the wheel spokes being provided.

The features relating to inverting the device and for shifting the chains are of importance since chains become quickly worn as a rule, and are comparatively expensive, and durability is therefore attained. It will also be seen that, during operation, stresses directed to the chains at the periphery of the tire will be sustained to advantage, the parts which cross at the periphery being sustained by adjacent parts which also cross at the periphery, the parts b and d at the sides also sustaining the parts c and e of the chains.

Any desired form for the links may be provided for the chains. Fig. 6 illustrates a modified form for the links of the endless chain 7', and by referring to said figure it will be seen that the arrangement of the endless chains 7' and 8' are the same as above described, the plates and clasps being omitted so that said arrangement may be clearly illustrated. As thus shown, the loops may be connected by means of the clamping-members 9'; the parts b' of the endless chain 7' are adapted to be disposed at the sides and its parts c' are adapted to cross the periphery of a tire, and the endless chain 8' is so arranged that it has parts d' adapted to be disposed at the sides and its parts e' are adapted to cross the periphery of a tire.

While I have described endless chains adapted to bear upon the tire in a particular manner, and prefer this construction, I do not wish to be understood as limiting myself to the specific arrangement shown, nor to form, size or proportion of parts, since the scope of the invention is determined by the claims.

I claim:

1. A non-slipping device for wheel tires, comprising a pair of endless chains adapted to be mounted on the tire and having intersecting parts at the sides and periphery of the tire, each endless chain being arranged to permit a movement longitudinally of the tire, the parts thereof at the sides moving to the periphery of the tire.

2. A non-slip device for wheel tires, comprising a pair of endless chains adapted to be mounted on the tire and having intersecting parts at the sides and periphery of the tire, each endless chain being arranged to permit a movement longitudinally of the tire, the parts of the chains at the sides moving to the periphery of the tire and the parts of said chains at the periphery moving to the sides of the tire.

3. In a non-skid device for wheel tires, the combination of an endless chain having portions embracing parts of the sides and having portions disposed at the periphery of the tire, a second endless chain having portions embracing parts of the sides and having portions disposed at the periphery of the tire, and a plurality of holder-members disposed at longitudinal intervals of the tire for engaging said endless chains, the engagement of said holder members with the chains being such as to permit one of the endless chains to be shifted longitudinally of the tire independently of a movement of the other endless chain.

4. An anti-skid device for wheel tires, comprising a pair of endless chains mounted on the tire, clamping members for removably connecting terminal parts of said chains, and holder-members disposed at longitudinal intervals of the tire for engaging and for permitting the chains to be shifted longitudinally of the tire independently of each other.

5. A non-slip device for wheel tires, comprising a pair of endless chains adapted to be mounted on the tire and having parts disposed at the sides and having intersecting parts at the periphery of the tire, holder-members for removably engaging the endless chains at the sides of the tire, hollow plates open at their ends for circumscribing the intersecting parts of the chains at the periphery of the tire, said plates being provided with inwardly projecting lugs for removably engaging said chains and having flat portions for engaging the periphery of the tire when said device is inverted.

6. A non-skid device for wheel tires, comprising a pair of endless flexible members adapted to be arranged on the tire with intersecting parts at the sides and intersecting parts at the periphery of the tire, means for removably connecting said intersecting parts at the sides of the tire, a plurality of apertured plates open at their ends and disposed at longitudinal intervals of the tire for circumscribing the intersecting parts of said flexible members at the periphery of said tire, each plate having opposed flat surfaces and being provided at its open ends with inwardly projecting lugs and having inwardly projecting lugs formed in the wall of its aperture for removably engaging said endless flexible members.

7. A non-skid device for wheel tires, comprising a pair of endless flexible members having parts adapted to be disposed at the sides and having parts extending from the sides at less than a right angle across and intersecting each other at the periphery of the tire, each endless flexible member being so arranged that it may be shifted independently of the other endless flexible member longitudinally of the tire.

In testimony whereof, I have affixed my signature in presence of two witnesses.

DAVID H. WEIR.

Witnesses:
HIRAM A. STURGES,
ARTHUR H. STURGES.